Feb. 7, 1928.
M. R. HULL
1,658,123
AUTOMOBILE TOP
Filed June 27, 1923
2 Sheets-Sheet 2
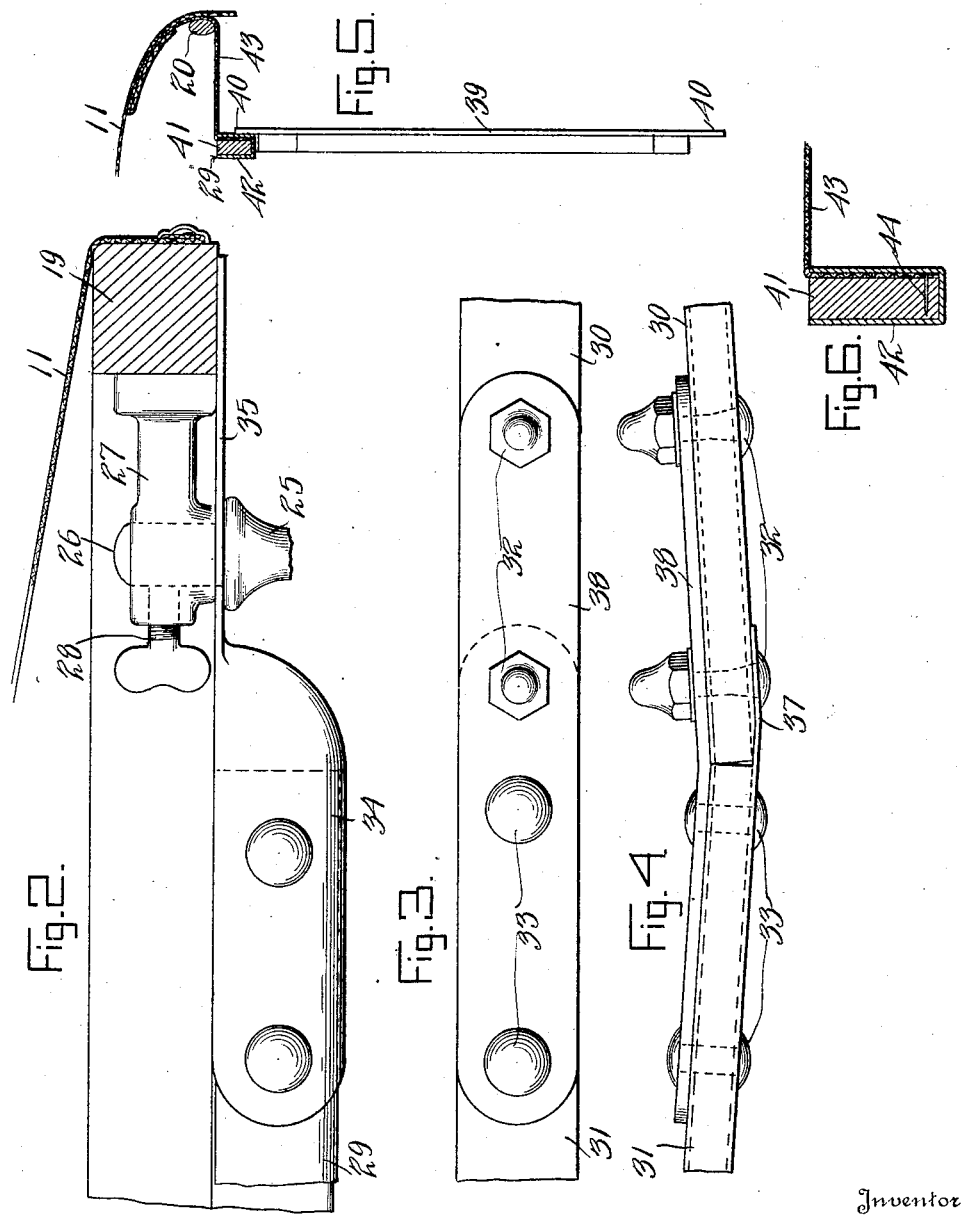
Inventor
Matthew R. Hull
By
Attorney Patented Feb. 7, 1928.

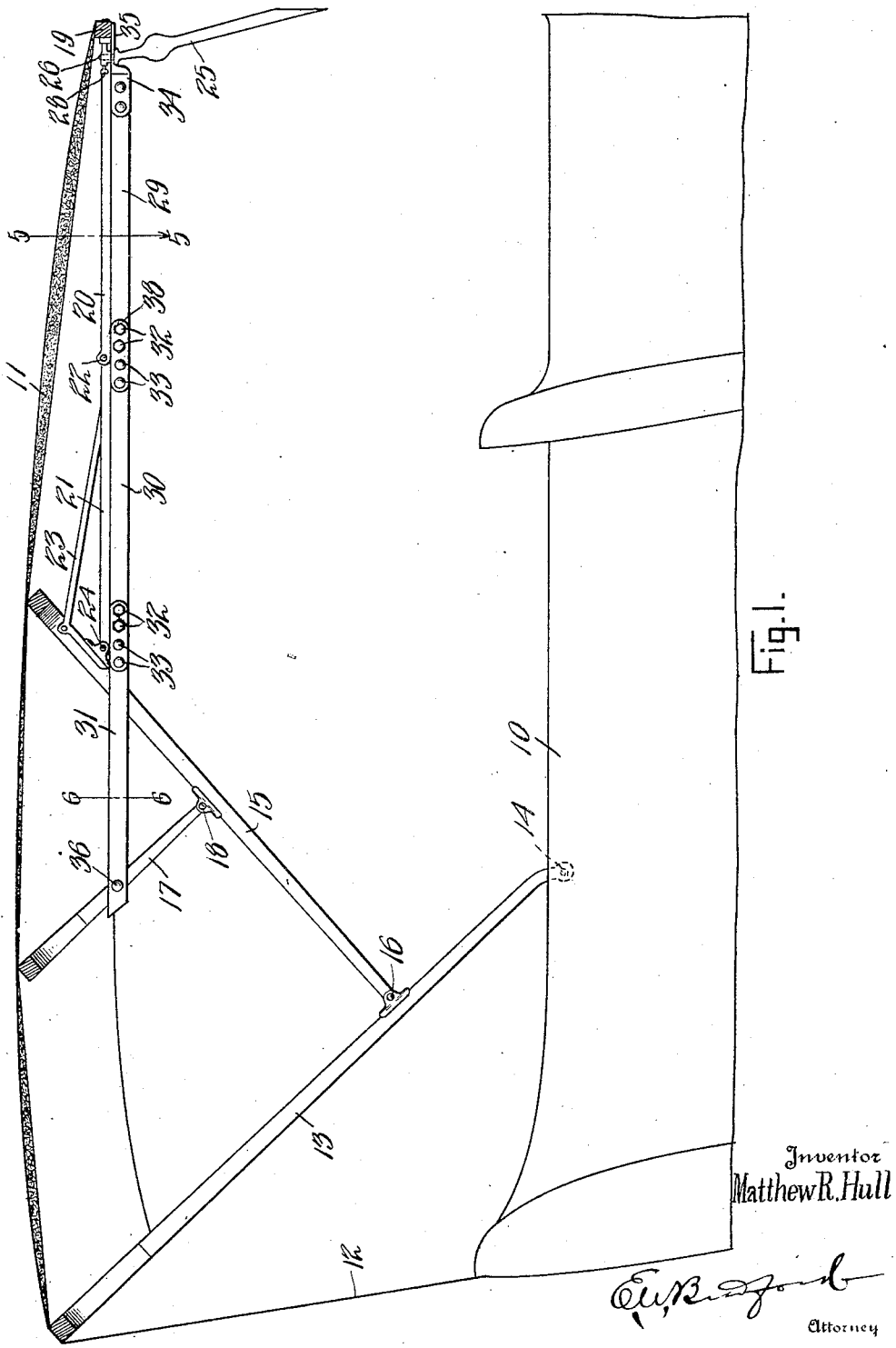

1,658,123

UNITED STATES PATENT OFFICE.

MATTHEW R. HULL, OF CONNERSVILLE, INDIANA, ASSIGNOR TO REX MANUFACTURING COMPANY, OF CONNERSVILLE, INDIANA, A CORPORATION OF INDIANA.

AUTOMOBILE TOP.

Application filed June 27, 1923. Serial No. 648,094.

My said invention relates to an improvement in automobile tops for use with demountable parts by means of which the body of the car may be open in summer and closed in winter. In some types of automobiles the canopy is of substantially the same width from front to rear while the body of the car is widest at the rear and tapers toward the front from a point not far removed from the rear end resulting in a top structure which overhangs the forward side portions of the body. With such a structure it becomes difficult to add the necessary parts for giving the car a closed body in winter or rough weather and it is with the purpose of providing a convenient form of top whereby such parts may readily be added or removed that I have devised the present invention.

Referring to the accompanying drawings, which are made a part hereof and on which similar reference characters indicate similar parts, Figure 1 is a vertical longitudinal section through the body of a car equipped with the improvements above referred to, Figure 2, a longitudinal section of the top near one side thereof showing the method of attaching to the windshield and front bow of the top a rail which is an element of my invention, Figure 3, a detail side view of a part of said rail on an enlarged scale, Figure 4, a similar detail in plan, Figure 5, a section on line 5—5 of Figure 1, and Figure 6, a section on line 6—6 of Figure 1.

In the drawings reference character 10 indicates a part of the body of a car which may be of any conventional or desirable form and which has a canopy 11 and a rear closure 12 here shown as supported by a framework in a manner to be raised or folded back out of the way at will, this framework consisting of a bow 13 pivoted at 14 to the body, another bow 15 pivoted at 16 to the bow 13, a bow 17 pivoted at 18 to the bow 15, a front bow 19, and side members 20 and 21 hinged at 22 to each other and to a brace 23 forming two sides of a triangle fixed to the rear end of member 21 at 24. A windshield support of ordinary type is indicated at 25 and this is provided with a post 26 having a reduced upper end adapted to be received in an opening in a bracket 27 fixed to the front bow 19 and having a set screw 28 for securing the top to the post. The structure so far described is well known in the art and no novelty is claimed therefor.

For the purpose of adapting cars having the top wider than the body at the front end I have added at each side a rail directly above the upper edge of the respective side of the body, said rail consisting of three main bars 29, 30 and 31. The first named bar is secured to the second by bolts 32 and rivets 33, the bolts providing means for ready disconnection when the top is to be folded back, at which time one bolt is left to provide a pivot and the other bolt which normally makes the joint a rigid one is removed. At its front end the bar 29 is secured to the windshield post 26 by a casting 34 riveted to said bar at one end and at the other end having a flat horizontal extension 35 apertured to receive the reduced end of the windshield post and extending forward underneath the bow 19. The rear bar 31 is riveted at 36 to bow 17 and at its forward end is connected to a section 30 by bolts 32 and rivets 33. The bars 30 and 31 are located at an angle to each other as illustrated in Figure 4, the joint being strengthened by a projection 37 secured by one of the bolts 32 to the part 30 and by an internal brace 38 secured by bolts 32 and rivets 33 to the respective bars. A brace 38 is also provided at the junction of bars 29 and 30. This construction, as will be evident, provides a rigid rail extending from the windshield post to the rear edge of the door (or in a four-door body to the rear edge of the rear door) said rail being supported at the rear end by bar 31. The bars 29 and 30 provide a rigid abutment against which the door may rest at its upper edge, with the demountable upper section in approximately the same plane as the lower permanent door or door section.

In front of said door there may be a window panel 39 (Fig. 5) having upper and lower overlapping parts 40 resting respectively against the outer face of section 29 of the rail and the outer face of the permanent body. In a four door construction there may be demountable door sections similarly positioned with a panel between the doors also similarly supported if desired.

A preferred construction of the sectional rail is illustrated in Figure 6 where 41 indicates the wooden filler for each section and 42 a metallic channel bar protecting and reenforcing the filler. Between the filler bar and one side of the channel bar is the lower edge of a strip of leather or the like 43 secured by brads 44. This strip is secured at its upper edge to the canopy 11 and its horizontal part closes the space between the rail 20 and the secional rail to keep out dust and cold air.

It will be obvious to those skilled in the art that my device may be modified in various particulars without departing from the spirit of my invention and therefore I do not limit myself to what is shown in the drawings and described in the specification but only as indicated in the appended claim.

Having thus fully described my said invention, what I claim as new and desire to secure by Letters Patent, is:

The combination with an automobile body and a top structure which overhangs the forward side portions of said body, of a sectional side rail adjacent each side of said top directly above the upper edge of the respective side of the body, the connections between the adjacent sections of each rail being adapted for pivotal movement whereby each rail is foldable with the top structure and including means normally locking said sections rigidly together, means permanently fastening said rail adjacent its forward and rearward ends to the top, and a weather strip disposed between each side rail and the adjacent side edge of the top, substantially as set forth.

In witness whereof, I have hereunto set my hand at Connersville, Indiana this 25th day of June, A. D. nineteen hundred and twenty-three.

MATTHEW R. HULL.